United States Patent [19]
Hinshaw et al.

[11] Patent Number: 5,747,603
[45] Date of Patent: May 5, 1998

[54] POLYMERS USED IN ELASTOMERIC BINDERS FOR HIGH-ENERGY COMPOSITIONS

[75] Inventors: Jerald C. Hinshaw, Logan; R. Scott Hamilton, Bear River City, both of Utah

[73] Assignee: Thiokol Corporation, Ogden, Utah

[21] Appl. No.: 51,979

[22] Filed: May 19, 1987

[51] Int. Cl.$^6$ ............................................. C08G 65/32
[52] U.S. Cl. ..................... 525/403; 525/408; 525/409; 525/410; 525/411; 525/413; 525/415; 528/65; 528/66; 552/12; 149/19.4
[58] Field of Search .................. 149/19.4, 19.6; 525/403, 408, 409, 410, 411, 413, 415; 528/65, 66; 552/12

[56] References Cited

U.S. PATENT DOCUMENTS

| | | | |
|---|---|---|---|
| 3,350,245 | 10/1967 | Dickinson | 149/19.4 |
| 3,507,721 | 4/1970 | Nakagawa et al. | 149/19.6 |
| 3,695,952 | 10/1972 | Allen | 149/19.4 |
| 3,876,432 | 4/1975 | Carlick et al. | 528/531 |
| 3,878,004 | 4/1975 | Kamlet et al. | 149/88 |
| 3,909,497 | 9/1975 | Hendry | 149/19.4 |
| 3,928,501 | 12/1975 | Vandenberg | 525/359.2 |
| 3,972,856 | 8/1976 | Mitsch et al. | 149/19.3 |
| 4,098,626 | 7/1978 | Graham et al. | 149/19.4 |
| 4,243,605 | 1/1981 | Eisenhardt et al. | 556/414 |
| 4,263,444 | 4/1981 | Graham et al. | 149/19.4 |
| 4,268,450 | 5/1981 | Frankel et al. | 149/19.6 |
| 4,269,637 | 5/1981 | Flanagan | 149/19.6 |
| 4,379,903 | 4/1983 | Reed et al. | 149/19.4 |
| 4,393,199 | 7/1983 | Manser | 149/19.6 |
| 4,477,601 | 10/1984 | Battice | 252/182 |
| 4,483,978 | 11/1984 | Manser | 528/408 |
| 4,601,344 | 7/1986 | Reed et al. | 149/19.6 |
| 4,764,586 | 8/1988 | Manser et al. | 149/19.4 |
| 4,818,776 | 4/1989 | Koleske | 528/406 |
| 4,824,919 | 4/1989 | Baker et al. | 525/528 |

OTHER PUBLICATIONS

H.R. Kricheldorf, *Liebigs Ann. Chem.* pp. 772–792.

*Primary Examiner*—Edward A. Miller
*Attorney, Agent, or Firm*—Cushman Darby & Cushman IP Group of Pillsbury Madison & Sutro, LLP; Ronald L. Lyons, Esq.

[57] ABSTRACT

Difunctional, hydroxyl-terminated polymers in which the terminal hydroxyl group is non-primary or hindered are end-capped to provide unhindered, primary, terminal hydroxyl groups which promote an improved cure and improved mechanical properties of the cured elastomer. End-capping chemicals have an hydroxyl-reactive group at one end and a group at the other end which is removable to provide a primary, unhindered hydroxyl group. Short-chain, hydroxyl-terminated polymers are chain-extended with a diisocyanate.

14 Claims, No Drawings

POLYMERS USED IN ELASTOMERIC BINDERS FOR HIGH-ENERGY COMPOSITIONS

The present invention is related to polymers and their use as elastomeric binders, particularly those used for elastomeric binders in high-energy compositions, such as propellants, explosives, gasifiers or the like. More particularly, the invention is directed to end-capping hydroxyl-terminated polymers to improve their curability to elastomeric binders and improve the mechanical properties of the cured elastomeric binders. The invention is also directed to elongating hydroxyl-terminated polymers to enhance the mechanical properties of the cured elastomeric binders formed therefrom.

BACKGROUND OF THE INVENTION

Solid propellants for rocket motors or the like include a fuel material, a high-energy oxidizer and an elastomeric binder matrix in which the fuel material and oxidizer are dispersed and immobilized. The binder matrix includes the elastomeric binder and, often a plasticizer for the elastomeric binder. The elastomeric binder represents an energy limitation of a propellant composition in that the binder combination does not contribute substantially to the energy of the composition. A good deal of attention has therefore been given to developing elastomeric materials, useful as binders, having higher energies than the elastomers presently used.

One type of elastomer which has considerable promise as a more energetic binder is based upon glycidyl azide polymer (GAP). GAP is a hydroxyl-terminated polyether polymer having the general formula:

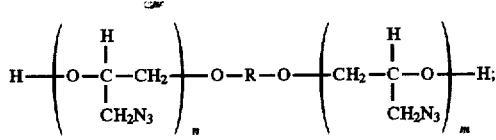

where R is typically a hydrocarbon moiety, such as —$CH_2$—$CH_2$—, —$CH_2$—1,4—$C_6H_{10}$—$CH_2$—, etc. Having terminal hydroxyl groups, GAP can be cured, as is conventional, with polyfunctional isocyanates to form elastomers. GAP-based elastomers used as propellant binders provide a definite energy advantage relative to polycaprolactone (PCP)-based elastomers and polyethylene glycol (PEG)-based elastomers, providing a 2–3 second increase in specific impulse ($I_{sp}$) relative to PEG and an even greater advantage relative to PCP. Unfortunately, the mechanical properties of GAP-based elastomers have often been less than desired for some applications. To date, GAP, which is derived from polyepichlorohydrin (PECH), has been limited in molecular weight to about 4000, and it is an object of the invention to produce a higher molecular weight GAP which would be expected to provide an elastomer with improved mechanical properties. Also, because the terminal hydroxyl groups of GAP are secondary hydroxyl groups, curing with polyfunctional isocyanates is less efficient than is desirable for achieving good mechanical characteristics of the cured elastomer.

Similar curing problems have been encountered with elastomers based upon other hydroxyl-terminated polymers where the terminal hydroxyl groups are either non-primary hydroxyl groups or the hydroxyl groups are otherwise hindered. Of particular interest are polyethers formed from oxetanes and combinations of oxetanes and tetrahydrofuran. Such polymers are described, for example, in U.S. Pat. No. 4,483,978 to Manser, the teachings of which are incorporated herein by reference, and also in U.S. patent application Ser. Nos. 925,657–925,660, each filed Oct. 29, 1986, the teachings of which are incorporated herein by reference. The oxetane monomers from which these polymers are formed generally have the formula

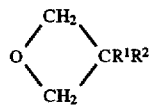

and yield mer units having the formula: —($CH_2$—$CR^1R^2$—$CH_2O$—) where $R^1$ and $R^2$ are pendant groups. Although the hydroxyl group at the termini of oxetane-derived polymers are generally primary alcohols, where $R^1$ and $R^2$ are bulky groups, e.g., where the terminal mer units have a neopentyl type structure, the terminal hydroxyl groups may be sufficiently hindered that efficient curing does not take place.

Accordingly, it is a general object of the present invention to improve the curability of polymers which do not cure efficiently due to non-primary or hindered terminal hydroxyl groups. It is another general object of the present invention to elongate polymer chains which are not otherwise produceable in chain lengths consistant with good mechanical characteristics of the cured elastomer.

There have been previous attempts to improve the curability of polymers which do not cure efficiently due to hindered, terminal hydroxyl groups. One example of such a prior attempt is to end-cap GAP with a low molecular weight chemical which provides unobstructed primary hydroxyl groups. In this prior attempt, GAP is first reacted with phosgene, and the product is then reacted either with a straight-chain molecule having primary hydroxyl groups at both ends or with a straight-chain molecule having a primary hydroxyl group at one end and a primary amine group at the other end according to the following scheme:

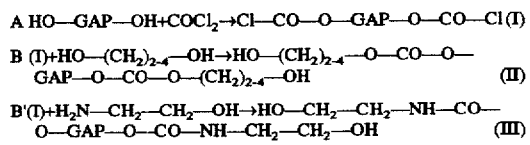

The end product of reactions B and B' each have terminal, primary hydroxyl groups which improve the curability of the polymer. However, an important disadvantage of this scheme is that reactions A and B are not stoichiometric. In reactions A and B, significant side reaction products result from chain extension, i.e., through the second Cl of the phosgene in reaction A and through the exposed terminal hydroxyl group of product (II) with unreacted (I) in reaction B. To minimize chain extension reactions in reaction A, the phosgene is provided in substantial excess. Likewise, in reaction B, the dihydroxyl compound is provided in substantial excess. Even so, unpredictable chain extensions occur. It is desirable to avoid use of an excess of reagents because this leads not only to polymer purification problems but also to waste and recovery problems, particularly with respect to highly toxic phosgene in reaction A.

An improved method for end-capping hydroxyl terminated polymers is desirable.

SUMMARY OF THE INVENTION

In accordance with the invention, hydroxyl-terminated polymers, in which the terminal hydroxyl groups are non-primary or are hindered, are stoichiometrically end-capped to provide the polymer with terminal, primary, non-hindered hydroxyl groups. The polymers so modified are more efficiently cured, e.g., with isocyanates, and the cured elastomers exhibit better mechanical properties. Stoichiometric end-capping is achieved through the use of a generally linear chemical compound having a functionality at one end which reacts stoichiometrically with the terminal hydroxyl groups of the polymer and a functionality at the other end which is attached to a protected primary hydroxyl group and which is deprotected to provide a free primary hydroxyl group under conditions which (a) do not break the bond between the functionality which was previously reacted with the previously existing terminal free hydroxyl groups of the polymer and (b) does not disrupt the chemical integrity of the polymer chain.

In cases where the polymer has not been synthesized to a molecular weight which is most conducive to good mechanical characteristics of a cured elastomer, as is often the case with GAP, stoichiometric chain-extension is achieved with a diisocyanate.

DETAILED DESCRIPTION OF CERTAIN PREFERRED EMBODIMENTS

The end-capping method of the present invention is applicable to any hydroxyl-terminated polymer. It is most useful for polymers in which the terminal hydroxyl groups are secondary or even tertiary. It is also applicable to polymers having terminal hydroxyl groups which are primary, but nevertheless, hindered. Hindered primary hydroxyl groups are those having the general formula:

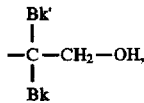

where Bk and Bk' represent bulky chemical moieties. How bulky the Bk and Bk' groups must be to hinder curing of the polymer cannot be precisely determined in advance; however, if an efficient cure is difficult to achieve, curability may be enhanced by the end-capping method of this invention. Terminal hydroxyl groups bonded to a neopentyl type structure, i.e.,

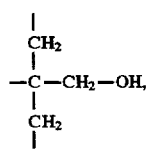

such as are commonly seen on 3,3-disubstituted oxetane-derived polymers, generally exhibit cure properties which may be improved by end-capping according to the invention. If there is only one bulky group on the carbon that is beta to the terminal, primary hydroxyl group, achieving an adequate cure is generally not a problem, nevertheless if the one bulky group on the beta carbon is sufficiently hindering to the primary hydroxyl group, curability of the polymer may be enhanced by end-capping in accordance with the present invention.

End-capping chemical compounds in accordance with the invention have the general formula X—Q—(CH$_2$)$_n$—O—Z; wherein X is a group which reacts readily with the preexisting terminal hydroxyl groups of the polymer to attach the compound to the polymer; Z is a blocking group which does not react with free hydroxyl groups and which may be removed under conditions which do not detach the end-capping compound from the termini of the polymer and do not affect the polymer backbone; Q is nothing or is any chemical moiety which does not interfere with joining the end-capping chemical to the polymer, with detaching the Z moiety of the capping compound or with subsequent curing of the end-capped polymer; and n is 1 or 2.

Examples of suitable X moieties of the end-capping compound include isocyanate (OCN—) isothiocyanate (SCN—); Hal—CO— where Hal is a halogen such as chlorine, bromine, fluorine or iodine, activated esters, such as NO$_2$—C$_6$H$_4$—O—CO—; and mixed anhydrides. X may also be an alkyl halide, particularly an activated alkyl halide, such as a benzyl halide. Isocyanate and isothiocyanate groups are preferred moieties as they do not produce a byproduct which might present purification problems.

The Z moiety may complete (with the oxygen) a silyoxy moiety, e.g., trimethyl silyoxy or triethyl silyoxy, or may complete an ester moiety, e.g., —O—Z being —O—CO—CH$_3$, —O—CO—C$_2$H$_5$, —O—CO—CF$_3$, —O—CO—C$_6$H$_5$, etc.

The (CH$_2$)$_{1\ or\ 2}$ group of the end-capping chemical provides that the hydroxyl group which is residual upon removal of Z is primary and that it is non-hindered. To ensure that the hydroxyl group is sufficiently unhindered for good cure properties and yet does not add unnecessary non-functional weight, it is preferred that n is 2.

If a Q moiety is present, it is advantageous if it spaces the —O—Z group further from the terminus of the polymer, e.g., Q may be additional —CH$_2$— groups. The Q moiety may also be selected to enhance activity of the X moiety with hydroxyl groups; thus, if X is OCN—, Q may be an aromatic ring. Although there is relatively little restriction to Q moieties which might be included in an end-capping compound, it is preferred not to include a Q moiety without purpose, as non-functional Q moieties add to the weight of the polymer and generally do not enhance energy of the propellant composition.

A specific example of an end-capping compound useful in the practice of the present invention is 2-trimethylsilyoxyethylisocyanate (TMSI), OCN—CH$_2$—CH$_2$—O—Si(CH$_3$)$_3$, H. R. Kricheldorf, *Liebigs Ann. Chem.* pp. 772–792 (1973). Other useful end-capping compounds include 4-(2-trimethysilyoxyethyl) phenylisocyanate OCN—pC$_6$H$_4$—CH$_2$—CH$_2$—O—Si(CH$_3$)$_3$ and 6-trimethylsilyoxyhexylisocyanate OCN—(CH$_2$)$_6$—O—Si(CH$_3$)$_3$.

In accordance with a preferred aspect of the invention, where the X moiety is an isocyanate group, the reaction with the hydroxyl-terminated polymer is facilitated by being carried out in the presence of a catalyst. Tin catalysts, such as dibutyltin diacetate, promote the reaction of an isocyanate with terminal hydroxyl groups, and such catalysts were used in initial end-capping experiments. However, tin catalysts are somewhat undesirable from the standpoint that they are difficult to remove from the end-capped polymer. Unfortunately, residual tin catalysts also promote more rapid curing of the end-capped polymer with multifunctional isocyanate curatives. It is a general problem with propellant formulations to provide a sufficiently long pot life (the time after mixing when the propellant formulation is castable, e.g., before viscosity becomes excessive due to the amount of cure), and residual tin catalysts reduce pot life. Accordingly, it is preferred to use tertiary amine catalysts, such as triethyl amine, which are more readily removable from the end-capped polymer and therefore do not reduce pot life of the uncured propellant formulation.

The addition of the end-capping compound to the polymer is generally carried out in an appropriate non-reactive organic solvent, such as methylene chloride chloroform, trichloroethane, dichloroethane, benzene, toluene, acetonitrile and tetrahydrofuran. Time and temperature conditions will vary depending upon the nature of the X moiety, the presence or absence of a catalyst and the degree to which the terminal hydroxyl groups of the polymer are hindered. If X is an isocyanate moiety, end-capping may proceed at room temperature, but the rate is improved with elevated temperatures.

End-capping in accordance with the invention is substantially stoichiometric, that is, if two moles of end-capping compound are used with each mole of di-functional polymer molecule, at least about 90% of the terminal hydroxyl groups will be capped, and end-capping of close to 100% of the terminal hydroxyl groups may be expected with many X moieties, e.g., isocyanate. Generally, the end-capping compound is added at about a 2 molar ratio relative to difunctional polymer molecules. Those skilled in the art will recognize that determinations of polymer equivalent weight are not always accurate and that the end-capping compound may interact with impurities; thus, to achieve full end-capping, some excess of end-capping chemical may be used. Large excesses, however, are wasteful and could result in polymer purification difficulties from excess reagent or reagent-derived impurities. Less than a 2 molar ratio of end-capping chemical to polymer may be used, where less than complete end-capping is consistant with effecting a sufficient cure and achieving required elastomer mechanical properties. Generally, a molar ratio of end-capping chemical to polymer of at least about 1 is used to enhance curability of the polymer and enhance mechanical characteristics of the elastomer which is formed.

Subsequent to end-capping the polymer, the blocking Z group is removed. This is generally carried out in an organic solvent using a trace amount of an organic acid, such as trifluroacetic acid. The solvent may enter into the reaction, attaching to the Z moiety. For example, when TMSI (or any other chemical containing a trimethylsilyoxy blocking group) is the end-capping compound and methanol is the solvent, $CH_3$—O—$Si(CH_3)_3$ is formed. This compound is volatile and easily removed. Advantageously, $CH_3$—O—Si$(CH_3)_3$ is readily converted to $ClSi(CH_3)_3$, which in turn may be reconverted to TMSI, whereby the —$Si(CH_3)_3$ group may be recycled.

In accordance with another aspect of the invention, where the hydroxyl-terminated polymer, as polymerized by conventional methods, is of insufficient chain length to impart good mechanical properties to a cured elastomer, the hydroxyl-terminated polymer may be chain-extended by reaction with a diisocyanate. The chain-extending reaction is substantially stoichiometric, the relative proportion of the chain-extending isocyanate to polymer molecules determining the average number of polymer molecules joined together and thereby the average molecular weight or length of the joined polymer. Thus, if the average molecular weight is to be approximately doubled, one mole of diisocyanate will be used per two moles of polymer molecules; if the average molecular weight is to be approximately tripled, two moles of diisocyanate will be used per three moles of polymer molecules; etc.

As in the end-capping reaction, the chain elongation reaction is generally carried out in organic solvent and in the presence of a catalyst, such as a tin catalyst, but preferably a more readily removable amine catalyst. Suitable diisocyanates include, but are not limited to toluene 2,4 diisocyanate (TDI), hexamethylenediisocyanate (HDI) and isophorone diisocyanate (IPDI).

It is noted above that chain extension of hydroxyl-terminated polymers has been achieved, as an undesirable side reaction, for example, in attempts to end-cap hydroxyl-terminated polymers with phosgene. It is to be noted that although hydroxyl-terminated polymers might be chain-extended with phosgene, if end-capping, as taught by this invention, is further contemplated, phosgene chain extension is undesirable. The C—O—CO—O—C chain extension bond formed by phosgene may be significantly cleaved under the conditions which remove the end-capping Z moiety. On the other hand, the urethane chain extension bond formed using a diisocyanate is stable under the mild conditions used to deblock the end-capped polymer.

Modified polymers may be (and in producing elastomeric binders generally are) cured with polyisocyanate curatives. Typically the amount of isocyanate used to cure propellants containing modified polymers is determined by the desired mechanical properties. This determination is arrived at empirically by making the same propellant formulation with varying concentrations of isocyanate curative. The ratio of polymer to curative is referred to as the NCO/OH ratio. After the propellants have cured, the mechanical properties of the propellants made with varying NCO/OH ratios are determined. The propellant with the NCO/OH ratio that gives the desired mechanical properties is used for all future mixes of that propellant formulation. This method applies to high and lower energy propellant formulations.

The curative must provide sufficient functionality to both chain-extend and cross-link the polymer. For hydroxyl-terminated polymers having functionalities of 2, an isocyanate curative having a functionality of greater than 2 and typically 3 or more may be used. One commonly used curative is a mixed isocyanate sold under the tradename Desmodur N-100® having a functionality of about 3.6. Alternatively, a diisocyanate may be used in conjunction with an additional cross-linking agent having higher functionality, such as a low-molecular weight trihydroxyl compound, e.g., trimethylol propane or 1,2,6 hexanetriol.

Propellant compositions have NCO/OH equivalencies in the range of about 0.5–2.0 and more generally in the range of about 0.8–1.5. The isocyanate curative generally comprises between about 0.5 and about 1.5 weight percent of the cured elastomer components, i.e., polymer plus curative.

Curing is effected at elevated temperatures to promote relatively rapid curing. Typically, hydroxyl-terminated polymers are cured with isocyanates at temperatures of 120°–130° F. (49°–54° C.) for a period of several days.

In high-energy compositions, the polymer is mixed with solids, including fuel material particulates, e.g., aluminum, and oxidizer particulates, e.g., ammonium perchlorate (AP), cyclotetramethylene tetranitramine (HMX) and/or cyclotrimethylene trinitramine (RDX). Then, the isocyanate curative is added and the uncured formulation is cast, e.g., into a rocket motor casing, and curing is effected at appropriate temperatures and for appropriate time periods.

High-energy compositions typically contain between about 70 to 90% solids, including oxidizer particulates and/or fuel material particulates. The balance comprises the components of the elastomeric matrix, including the binder polymer and the curative. The elastomeric matrix components may also contain a plasticizer. If the polymer is miscible with a high-energy plasticizer, the binder components may advantageously include such a plasticizer. In propellants where specific impulse is of primary importance and a class 1.1 propellant is acceptable from a hazards sensitively standpoint, a high level of nitrate ester plasticizer is preferably included in the binder matrix. In such propellant binders, plasticizer-to-polymer ratios of at least about 2.0:1 and preferably at least about 2.5:1 are used. Nitrate ester plasticizers include, but are not limited to, nitroglycerine, butanetriol trinitrate and trimethylolethane trinitate. High-energy formulations may also contain a variety of minor components, such as processing aids, additional cross-linking agents, flow control agents, etc.

The invention will now be described in greater detail by way of specific examples:

EXAMPLE 1

Hydroxyl-terminated GAP (A) was used to produce (B) end-capped GAP, (C) chain-extended GAP and (D) chain-extended and end-capped GAP as follows:

(B) Endcapping GAP with TMSI

To a solution of 20.17 gms (0.0173 eq) of GAP (A) (1166 gms/eq., $\overline{M}_w=2530$, $\overline{M}_w/\overline{M}_n=1.26$) in 40 ml of dry methylene chloride under a dry nitrogen atmosphere was added 2.8 gms (0.0173 eq) of trimethylsilyoxyethylisocyanate. To this stirred solution was added 0.06 ml of a 2.5% solution of dibutytin diacetate in methylene chloride. The reaction was stirred and refluxed under a nitrogen atmosphere for 18 hrs. The reaction was cooled to room temperature. Methanol (20 ml) was added, followed by 0.66 ml of trifluoroacetic acid. The mixture was stirred at room temperature for 2 hours. Saturated aqueous sodium bicarbonate solution (35 ml) was then added with vigorous stirring. The aqueous layer was separated, and the methylene chloride solution was washed with water and dried over anhydrous magnesium sulfate. After removal of the drying agent by filtration, the methylene chloride solvent was removed from the modified polymer under reduced pressure. The final traces of solvent were removed at 50° C. under high vacuum. The H-1 NMR spectrum of this material showed about 90% primary and 10% secondary hydroxyl functionality. Eq. wt.=1366 gms/eg., $\overline{M}_w=2460$, $\overline{M}_w/\overline{M}_n=1.24$.

(C) HDI Chain Extension of GAP

To a solution of 94.8 grams (0.0813 eq.) of GAP (A) (1166 gms/eq., $\overline{M}_w=2530$, $\overline{M}_w/\overline{M}_n=1.26$) in 200 ml of dry methylene chloride under a nitrogen atmosphere was added 3.42 gms (0.04065 eq.) of hexamethylene diisocyanate (HDI). To this stirred solution was added 0.32 ml of a 2.5% solution of dibutyltin diacetate in methylene chloride. The reaction was stirred and refluxed under nitrogen for 18 hours. After this time, the methylene chloride solvent was removed under reduced pressure. The final traces of solvent were removed at 50° C. under high vacuum. Eq. wt.=2532 gms/eq., $\overline{M}_w=5640$, $\overline{M}_w/\overline{M}_n=1.72$.

(D) Endcapping of HDI Chain Extended GAP with TMSI

The above chain-extended polymer (C) (0.05 eq.) was dissolved in 125 ml $CH_2Cl_2$ and treated with TMSI (0.05 eq.) followed by trifluoroacetic acid/methanol exactly as described above for the end-capping of unmodified GAP (A). The isolated polymer showed: eq. wt.=2597 gms/eq., $\overline{M}_w=5610$, $\overline{M}_w/\overline{M}_n=1.67$. NMR analysis showed about 90% primary hydroxyl terminal functionality.

The following properties of GAP's A, B, C and D are as follows:

|   | $\overline{M}_N$ | $\overline{M}_W$ | Equivalent wt. by titration | Equivalent wt. by NMR |
|---|---|---|---|---|
| A | 2008 | 2530 | 1174 | 1166 |
| B | 1984 | 2460 | 1366 | 1415 |
| C | 3270 | 5640 | 2532 | 2344 |
| D | 3350 | 5410 | 2597 | 2459 |

Gumstocks from the GAP's were prepared by mixing eight grams of polymer with the required amount (based on polymer equivalent weight) of isocyanate curative (Desmodur N-100®) for the desired NCO/OH ratio. The fluid gumstock material was cast into uniaxial tensile specimen molds and allowed to cure for several days at about 120°–130° F.

Mechanical properties of the gumstocks are compared in the following table:

| Gumstock | GAP (A) | | | | CAPPED GAP (B) | | | |
|---|---|---|---|---|---|---|---|---|
| NCO/OH | 0.8 | 0.9 | 1.0 | 1.1 | 0.8 | 0.9 | 1.0 | 1.1 |
| Mechanical Properties | | | | | | | | |
| $E^{1.0}$ (PSI) | 122 | 165 | 241 | 300 | 95 | 175 | 215 | 275 |
| $\epsilon_m^t$ (%) | 41 | 32 | 30 | 21 | 78 | 51 | 53 | 36 |
| $\sigma_m$ (PSI) | 36 | 40 | 46 | 58 | 43 | 56 | 70 | 82 |
| Shore A | 34 | 35 | 46 | 51 | 29 | 39 | 48 | 50 |

| | CHAIN EXTENDED GAP (C) | | | | CAPPED, CHAIN EXTENDED GAP (D) | | | |
|---|---|---|---|---|---|---|---|---|
| NCO/OH | 0.8 | 0.9 | 1.0 | 1.1 | 0.8 | 0.9 | 1.0 | 1.1 |
| Mechanical Properties | | | | | | | | |
| $E^{1.0}$ (PSI) | 48 | 59 | 81 | 134 | 54 | 95 | 138 | 165 |
| $\epsilon_m^t$ (%) | 141 | 99 | 95 | 51 | 104 | 102 | 78 | 61 |
| $\sigma_m$ (PSI) | 30 | 33 | 41 | 51 | 30 | 55 | 59 | 65 |
| Shore A | 15 | 15 | 28 | 35 | 13 | 25 | 35 | 40 |

$E^{1.0}$ = modulus at a gauge length of 1.0
$\epsilon_m^t$ = strain (elongation)
$\sigma_m$ = stress In conclusion, all modified GAP polymers show cured mechanical property improvements.

Propellants were prepared from unmodified GAP and from end-capped GAP (B). All propellants had 77% total solids, 76% ammonium perchlorate, 4% trimethylolethane trinitrate/triethyleneglycoldinitrate ⅓. Mechanical properties are as follows:

| GAP Modification | NCO/OH | $E^{2.7}$ (PSI) | $\epsilon_m^{t,c}$ (%) | $\sigma_m^c$ (PSI) |
|---|---|---|---|---|
| None | 0.7 | 394 | 23 | 101 |
| Capped (B) | 0.8 | 1718 | 14 | 276 |
| Capped (B) | 0.7 | 926 | 21 | 189 |

$E^{2.7}$ = modulus at a guage length of 2.7
$\epsilon_m^{t,c}$ = true, corrected strain
$\sigma_m^c$ = corrected stress

EXAMPLE 2

Endcapping Poly BAMO/NMMO with TMSI

To a solution of 25.11 g (0.005073 eq) of poly (3,3-bis (azidomethyl) oxetane-copoly-3-nitratomethyl, 3-methyl oxetane) (4950 gms/eq) in 50 ml of dry methylene chloride under a dry nitrogen atmosphere was added 0.808 gms (0.005073 eq) of trimethylsiloxyethyl isocyanate. To this stirred solution was added 0.007 ml of a 1.34% solution of dibutyltin diacetate in methylene chloride. The reaction was stirred and refluxed under a nitrogen atmosphere for 24 hours. The reaction was cooled to room temperature. Methanol (5 ml) was added followed by 0.20 ml of trifluoroacetic acid. The mixture was stirred at room temperature for 2 hours. Aqueous sodium bicarbonate solution (25 ml) containing 0.25 grams of sodium bicarbonate was then added with vigorous stirring. The aqueous layer was separated and the methylene chloride solution was washed with water, separated and dried over anhydrous magnesium sulfate. After removal of the drying agent by filtration, the methylene chloride solvent was removed under reduced pressure leaving the modified polymer. The final traces of solvent were removed at 50° C. under high vacuum.

Gumstocks were prepared by mixing 4 gm of polymer with the required amount of curative, cast into uniaxial tensil specimen molds and cured for several days at 120° F.

| Mechanical Properties of Poly BAMO/NMMO Gumstock | | | | |
|---|---|---|---|---|
| Poly BAMO/NMMO | NCO/OH | $E^{1.0}$ (psi) | $\epsilon_m^t$ (%) | $\sigma_m$ psi |
| Unmodified | 0.9 | 19 | 390 | 36 |
| Endcapped | 0.9 | 58 | 208 | 61 |

The end-capped poly BAMO/NMMO shows a significant increase in stress and modulus due to higher cross-link density resulting from the end-capping.

The invention is addressed to providing an improved cure for hydroxyl-terminated polymers, which cure is effected, at least in part, with isocyanate curatives. At the same time, preferred end-capping chemicals contain isocyanate or isothiocyanate moieties for reaction with the pre-existing terminal hydroxyl groups. Although this may appear to be an inconsistancy, it is not. In propellant compositions, in addition to the polymer, there are several additional ingredients. Also, impurities are present and moisture may enter the reaction. Any additional ingredients, impurities and moisture may react with the isocyanate curative. For example, MNA used in some of the above formulations is reactive with isocyanate curative. Thus, if the polymer itself reacts too slowly with isocyanate because its terminal hydroxyl groups are non-primary or otherwise hindered, sufficient levels of side reactions may occur such that the propellant composition which is formed upon curing lacks the requisite mechanical properties. On the other hand, the end-capping reaction can be much more carefully controlled. Additional isocyanate-reactive ingredients are eliminated, impurities are minimized, moisture can be more easily kept out and the reaction is carried out in a non-reactive organic solvent. Thus, even if the reaction of an isocyanate or isothiocyanate group with terminal hydroxyl groups in an end-capping reaction is relatively slow, it may be substantially stoichiometric.

Several advantages of the methods of the present invention may now be more fully appreciated. Reagents are used in stoichiometric amounts, avoiding the use of large excesses of materials with resulting purification problems. End-capping reagents are monofunctional in alcohol reactivity which eliminates the potential for undesired dimerization of polymer chains often observed when using difunctional polymer modifying chemicals, such as phosgene. The end-capping and extension reactions are "one-pot" reactions, eliminating the need for several polymer isolation/purification steps which are often necessary, especially when large excesses of reagents are used, in conventional polymer capping chemistry.

While the invention has been described with respect to certain preferred embodiments, modifications obvious to one with ordinary skill in the art may be made without departing from the scope of the invention.

Various features of the invention are set forth in the following claims.

What is claimed is:

1. A method for improving the curability of a hydroxyl-terminated polymer comprising, providing an end-capping compound having the formula X—Q—(CH$_2$)$_n$—O—Z; wherein X is a group which reacts readily with the terminal hydroxyl groups of the polymer to attach said compound to said polymer; Z is a blocking group which does not react with free hydroxyl groups and which may be removed from the linked oxygen under conditions which do not detach the residue of said compound from the termini of said polymer; Q is nothing or is any chemical moiety which does not interfere with attachment of said compound to said polymer, removal of said Z moiety or subsequent curing of the end-capped polymer, and n is 1 or 2;

reacting said end-capping compound with said polymer; and removing Z from said end-capped polymer to provide primary, unhindered hydroxyl groups at the termini of said end-capped polymer.

2. A method according to claim 1 wherein n is 2.

3. A method according to claim 1 wherein the terminal hydroxyl groups of said polymer prior to end-capping are bonded to a neopentyl type structure.

4. A method according to claim 1 wherein said polymer is glycidyl azide polymer.

5. A method according to claim 1 wherein said polymer is a polymer or copolymer formed from one or more oxetanes.

6. A method according to claim 1 wherein X is selected from the group consisting of OCN—, SCN—, (halogen)-CO—, activated esters, mixed anhydrides and alkyl halides.

7. A method according to claim 1 wherein —O—Z comprises an alkyl siloxy moiety or an ester moiety.

8. A method according to claim 1 wherein said end-capping compound is selected from the group consisting of OCN—(CH$_2$)$_2$—O—Si(CH$_3$)$_3$, OCN—(CH$_2$)$_6$—O—Si(CH$_3$)$_3$ and OCN—pC$_6$H$_4$—(CH$_2$)$_2$—O—Si(CH$_3$)$_3$.

9. A method according to claim 1 wherein said hydrolysis of Z is carried out in an organic solvent in the presence of an organic acid.

10. A method according to claim 1 wherein the molar ratio of said end-capping compound to said polymer is at least about 1.

11. A method according to claim 1 wherein the molar ratio of said end-capping compound to said polymer is at least about 2.

12. A method of preparing a cured elastomer comprising, end-capping/deblocking an hydroxyl-terminated polymer in accordance with the method of claim 1, and curing said polymer with an isocyanate having a functionality of 2 or greater.

13. A method according to claim 12 wherein an NCO/OH ratio of at least about 0.5.

14. A method according to claim 1 wherein prior to end-capping said hydroxyl-terminal polymer, said polymer is reacted with a diisocyanate to extend the chain length.

* * * * *